United States Patent
Huff et al.

(10) Patent No.: US 9,419,807 B2
(45) Date of Patent: Aug. 16, 2016

(54) PD IN POE SYSTEM HAVING REDUNDANT PSE CHANNEL INPUTS

(71) Applicant: Linear Technology Corporation, Milpitas, CA (US)

(72) Inventors: Ryan Charles Huff, Santa Barbara, CA (US); Jeffrey Lynn Heath, Santa Barbara, CA (US); Kaung Zin Htoo, Santa Barbara, CA (US); Kirk Tzukai Su, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 199 days.

(21) Appl. No.: 14/288,103

(22) Filed: May 27, 2014

(65) Prior Publication Data

US 2015/0019884 A1 Jan. 15, 2015

Related U.S. Application Data

(60) Provisional application No. 61/845,453, filed on Jul. 12, 2013.

(51) Int. Cl.
*G06F 1/26* (2006.01)
*H04L 12/10* (2006.01)
*H04L 12/931* (2013.01)

(52) U.S. Cl.
CPC ........ *H04L 12/10* (2013.01); *G06F 1/26* (2013.01); *H04L 49/00* (2013.01)

(58) Field of Classification Search
CPC .................................. G06F 1/26; H04L 12/10
See application file for complete search history.

(56) References Cited

U.S. PATENT DOCUMENTS

| | | | | |
|---|---|---|---|---|
| 5,894,413 A * | 4/1999 | Ferguson | ........ | H02J 1/10 307/43 |
| 6,153,947 A * | 11/2000 | Rockow | ........ | H02J 7/0024 307/64 |
| 8,549,331 B2 * | 10/2013 | Karam | ........ | H04L 1/22 713/300 |
| 2006/0268898 A1 * | 11/2006 | Karam | ........ | H04L 12/10 370/401 |
| 2008/0100141 A1 * | 5/2008 | Lee | ........ | H02J 1/102 307/43 |
| 2010/0067372 A1 * | 3/2010 | Diab | ........ | H04L 1/22 370/228 |
| 2010/0199113 A1 * | 8/2010 | Lee | ........ | G06F 1/266 713/300 |
| 2010/0262309 A1 * | 10/2010 | Currie | ........ | H02J 3/005 700/291 |
| 2011/0125341 A1 * | 5/2011 | Heath | ........ | H02J 1/108 700/295 |
| 2013/0119768 A1 * | 5/2013 | Chang | ........ | H02J 7/34 307/66 |
| 2014/0361608 A1 * | 12/2014 | Wang | ........ | H04L 12/10 307/2 |

* cited by examiner

*Primary Examiner* — Jaweed A Abbaszadeh
*Assistant Examiner* — Cheri Harrington
(74) *Attorney, Agent, or Firm* — Patent Law Group LLP; Brian D. Ogonowsky

(57) ABSTRACT

A Powered Device (PD) in a PoE system has two input channels, each being coupled to a separate Power Sourcing Equipment (PSE) for increased reliability. A first PD controller is coupled to the first channel to perform hand-shaking and closes a first Power Good (PWRGD) switch when the PoE voltage is detected on the first channel. A second PD controller is coupled to the second channel to perform hand-shaking and closes a second PWRGD switch when the PoE voltage is detected on the second channel. A diode bridge couples both channels to a single regulating power supply that supplies power to a load. Auxiliary switches are controlled by the PWRGD signals so that only the first channel or the second channel is coupled to the diode bridge in the event that both channels receive the respective PoE voltages. Therefore, hot standby is provided using only one power supply.

20 Claims, 2 Drawing Sheets

PD IN POE SYSTEM HAVING REDUNDANT PSE CHANNEL INPUTS

CROSS-REFERENCE TO RELATED APPLICATIONS

This application claims priority from U.S. provisional application Ser. No. 61/845,453, filed on Jul. 12, 2013, by Ryan Huff et al., assigned to the present assignee and incorporated herein by reference.

FIELD OF THE INVENTION

This invention relates to Power Over Ethernet (PoE) techniques and, in particular, to a Powered Device (PD) having redundant Power Sourcing Equipment (PSE) channel inputs for hot-standby capability, while conforming to the IEEE standards for PoE.

BACKGROUND

Currently, Power Over Ethernet (PoE) is standardized by IEEE 802.3af and 802.3at. In PoE, Power Sourcing Equipment (PSE) is connected to a Powered Device (PD) via a standard Ethernet cable, and the PD is supplied DC power over the Ethernet data lines in the cable. In this way, the need for providing any external power source for the PD can be eliminated. The IEEE standard provides various hand-shaking requirements, voltage requirements, current requirements, power requirements, and other requirements for standardization.

In order for the PSE to know if the PD is PoE-enabled and the maximum power level of the PD, a low voltage/current detection and classification routine is conducted between the PSE and the PD. The PSE and PD contain controller ICs that carry out the various PoE routines and provide the required identification information. After a successful hand-shaking routine, the PSE supplies the full PoE voltage, such as 44 volts, to the PD. The PD controller IC detects the PoE voltage and then issues a Power-Good (PWRGD) signal, which closes a switch to connect the unregulated PSE voltage to a PD voltage regulator, such as a switching voltage regulator using transformer isolation. The switching regulator may be a buck/boost flyback regulator or any other suitable regulator. The regulator then supplies the target regulated voltage (e.g., 5 volts) to the PD load, such as electronic circuitry.

To achieve higher reliability that a PoE voltage is provided to the PD, the PD can receive two independent PSE channels. The channels can be provided via two Ethernet cables connected to two independent PSEs, or the data pair and spare pair of wires in a single Ethernet cable can be used to couple the two PSE channels to the PD.

FIG. 1 is a conventional design for a PD 10 with redundant PSE inputs, typically from an Ethernet switch. Each input channel, PSE CH. 1 and PSE CH. 2, is connected to a separate PSE power supply (not shown) and PSE controller IC (not shown) in the associated PSE (not shown). Since the incoming PSE voltage can be either polarity, a diode bridge 12 and 13 is provided for each channel. The PSE side also may supply differential data over the same twisted wire pair that supplies the DC power to the PD. The data may be tapped off at the inputs of the diode bridges 12/13 and applied to the PD load.

The PD controller IC for each channel is identified as PD controller 14 and PD controller 16. Upon powering up of the system, the PSE controller for each channel conducts a low voltage/current detection routine to detect the presence of a 25 k ohm resistor across the data wires, signifying that the PD is PoE-enabled. The resistors may be part of the PD controller ICs or external. If the PSE detects that the PD is PoE enabled, a low voltage/current hand-shaking routine is performed to obtain additional information about the PD and PSE, such as whether the PD is a Type 1 or Type 2 device, specifying different maximum power requirements and related requirements. This is the classification phase of the hand-shaking. The PSE low voltage powers the PD controllers 14 and 16 during this time. Each of the PD controllers 14 and 16 may operate independently during this phase.

Once the hand-shaking routine has been successfully performed, the PSE for each channel supplies the full voltage, such as 44 volts, to the input channels of the PD 10. The PD controllers 14/16 sense the proper high voltage and issue a Power-Good (PWRGD) signal, which closes the associated series switch 18 and 20 to couple the unregulated 44 volts to the input of a power supply 22 and 24 for each channel. The power supply 22/24 may be an isolated switching regulator using a transformer and isolated feedback (transformer or opto-coupling). As an example, each power supply may regulate the PSE voltage to 5 volts for powering the PD load 26. The load 26 may be electronic circuitry or any other load.

Diodes D1-D4 are coupled between the outputs of the power supplies 22/24 and the PD load 26 so that current from one power supply is not coupled to the other power supply. If the channel 1 voltage is higher than the channel 2 voltage, diodes D1 and D3 will be forward biased to couple the power supply 22 output to the PD load 26. Conversely, if the channel 2 voltage is higher than the channel 1 voltage, diodes D2 and D4 will be forward biased to couple the power supply 24 output to the PD load 26. If the voltages are precisely equal, both power supplies 22/24 may supply current to the PD load 26.

The advantage of the design of FIG. 1 is that there is no delay in providing power to the PD load 26 if one of the PSE channels fails. This is referred to as hot standby. The downside of the design of FIG. 1 is that two power supplies are needed, which adds cost, size, and power consumption. Further, if one channel is not supplying current to the PD load, and the unused channel draws less than 10 mA (an IEEE 802.3 standard), the PSE for that channel will interpret this as being a disconnected PD and will cease supplying voltage to the PD. In that case, hot standby is lost. However, an operating switching regulator may draw at least 10 mA even when the load is uncoupled from its output.

As an alternative, the two PD channels can be controlled by separate PD controller ICs (as in FIG. 1), and the two unregulated sets of PSE voltages can be connected via a diode bridge to the input of a single power supply (e.g., a switching regulator). In that way, only the higher of the two PSE voltages is coupled to the power supply input. However, according to the IEEE standards, the PSE must detect a minimum current drawn by the PD or else the PSE will cease supplying the full voltage. This minimum DC current is typically 10 mA and is called a PoE Maintain Power Signature (MPS). The PD must also provide an AC impedance of less than 26.3 k ohms in parallel with 0.05 uF. Disadvantages of this approach include: 1) the PSE for the unused channel will shut down since the minimum current requirement is not met; 2) the unused channel will continually cycle through the PoE detection/classification sequence; and 3) the system is not a hot-standby system since it takes time to power up the unused channel after a failure of the other channel.

What is needed is a PoE technique that provides hot-standby for the PD load but does not have the drawbacks of the prior art.

SUMMARY

In one embodiment of the invention, a PD circuit in a PoE system has two input channels connected to two PSEs. Each PSE may independently supply its full voltage of, for example, 44 volts upon a successful hand-shaking routine. The IEEE specifies an allowable range of 37-57 volts at the PD. Each PD channel has its own PD controller that independently communicates with the associated PSE to carry out the detection and classification phases of the hand-shaking routine. The PD controllers may perform other conventional functions, such as current limiting, thermal shutdown, etc. Upon the PD controllers detecting the proper full PSE voltage, the PD controllers issue a high Power-Good (PWRGD) signal to close an associated series switch (the "main" PWRGD switches) to connect the PSE voltage to a downstream circuit. The PD controller for channel 1 issues a PWRGD1 signal, and the PD controller for channel 2 issues a PWRGD2 signal.

The PD circuit further includes an auxiliary switch for each channel, downstream from the main PWRGD switches. Between the main PWRGD switches and the auxiliary switches is a Maintain Power Signature (MPS) resistor or a >10 mA current source across the wire pair that causes the PSE to detect a minimum current drawn by the PD channel of at least 10 mA to prevent the PSE for a channel shutting down even if that channel is not the active channel for supplying current to the PD load.

In one embodiment, the auxiliary switch for channel 2 is solely controlled by the PWRGD2 signal from the channel 2 PD controller. Therefore, the channel 2 PSE is the primary channel for supplying power to the PD load.

The auxiliary switch for channel 1 is closed only when there is a failure in the channel 2 PoE, which is indicated by a low PWRGD2 signal, along with a high PWRGD1 signal indicating a good channel 1 PoE. This detection is performed by a simple logic circuit.

Downstream of the auxiliary switches is a diode bridge that prevents the current from one channel from being coupled to the other channel. Only one channel can supply a voltage to the diode bridge due to the opposite states of the auxiliary switches, assuming at least one of the channels is receiving a PSE voltage Downstream from the diode bridge is a single power supply (e.g., a switching regulator) that receives the unregulated PSE voltage from either channel 1 or channel 2.

Accordingly, channel 1 will be disconnected from the diode bridge and power supply (due to its auxiliary switch) if channel 2 can supply the PoE voltage, and channel 1 will be connected to the diode bridge and power supply only if channel 2 cannot supply the PoE voltage but channel 1 can supply the PoE voltage. Even though channel 1 is disconnected from the PD power supply and PD load, the PSE connected to channel 1 will still detect that the MPS for that channel is above the 10 mA IEEE requirement. Therefore, the PSE will continue to supply the 44 volts to channel 1, and the detection and classification routine does not have to be performed again if channel 1 is later required to supply current to the PD load. Immediately after the PWRGD2 signal is deasserted due to a failure in channel 2, the auxiliary switch for channel 1 will close, and the PD load will be powered by channel 1 without interruption. Smoothing capacitors at the input and/or output of the power supply and/or at the output of the PD controllers smooth any switching transients.

The PWRGD signals are also OR's and applied to an enable terminal of the power supply.

In an alternative embodiment, some power is saved by only providing the MPS minimum-current resistor in channel 1 but not in channel 2. This is because, since channel 2 is the primary channel, the current will typically be above 10 mA due to the channel 2 being connected to the power supply and the PD load. Power may be additionally saved by an additional switch disconnecting the MPS resistor in channel 1 from across the wire pair when channel 1 becomes the channel supplying power to the load.

Other embodiments are described.

BRIEF DESCRIPTION OF THE DRAWINGS

Elements in the figures that are the same or equivalent are labeled with the same numeral.

DETAILED DESCRIPTION

Figure 1:
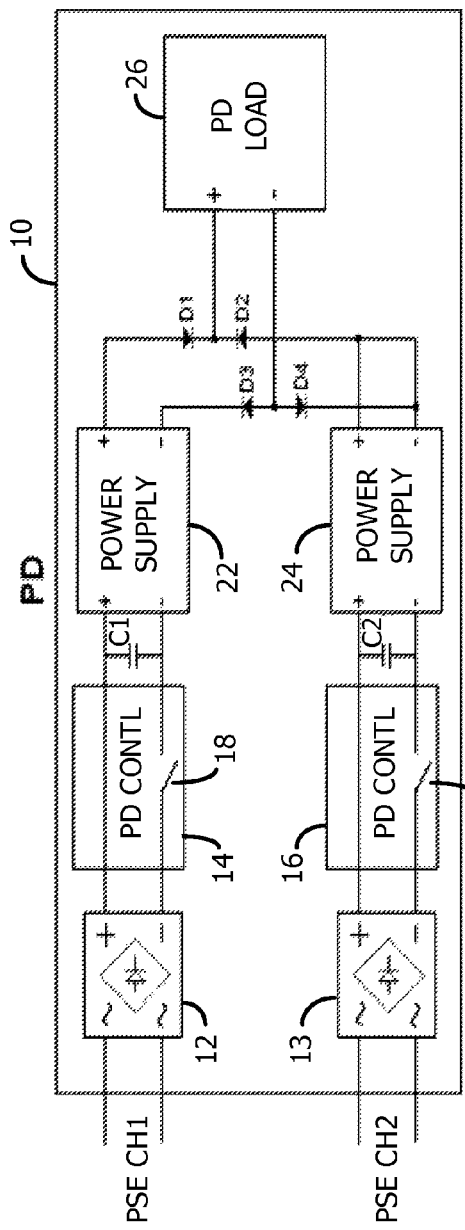
FIG. 1 illustrates a prior art PD coupled to two PSE channels in a PoE system to provide hot-standby.
Figure 2:
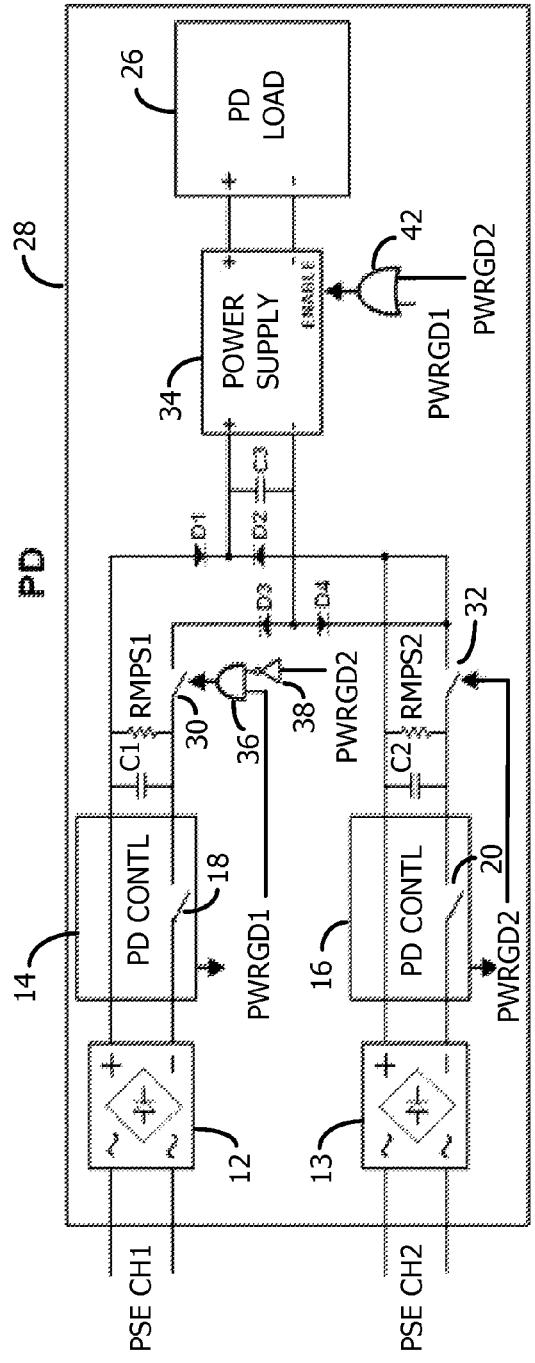
FIG. 2 illustrates a PD coupled to two PSE channels in a PoE system to provide hot-standby, in accordance with one embodiment of the invention.

FIG. 2 illustrates a PD circuit 28 that is a modification of the hot-standby PD circuit of FIG. 1, where there is no interruption in power to the PD load 26 if the primary PSE channel incurs a fault and the PD load 26 is then connected to be powered by the other channel.

The diode bridges 12/13, the PD controllers 14/16, and the main PWRGD switches 18/20 may be the same as in FIG. 1.

Upon the system powering up, the PSE controllers (not shown) and the PD controllers 16/18 perform a low voltage/current hand-shaking routine in accordance with the IEEE 802.3 standards for PoE. The PD controllers 16/18 may be any one of a variety of well-known commercially available PD controllers, such as the LTC4265, available from Linear Technology Corporation. This routine tests for a 25 k ohm resistance (a signature impedance) across the two wires for each channel to indicate that the PD is PoE enabled. The 25 k ohm resistor may be internal to the PD controller ICs or may be external to the ICs. The PSE also transmits test signals for determining the classification of the PD as a Type 1 or a Type 2, and may carry out other preliminary tasks before providing the full unregulated input voltage (e.g., 37-57 volts) across each of the channel wire pairs. For purposes of this disclosure, the hand-shaking may be any routine, such as only the detection routine, that is performed prior to the PSE supplying the full PoE voltage on the channel. The wire pairs may also carry differential data signals. Since the DC power is a common mode signal, it does not affect the data signals. A separate data path may be tapped off the channels' input wires for controlling the PD load 26 independent of the PoE function.

Carrying out the PoE hand-shaking routine takes some time. If the hand-shaking routine is successful, the PSE for each channel 1 and 2 delivers its full DC voltage of between 37-57 volts. The actual voltage depends on the losses over the Ethernet cable. As in the conventional PD circuit, the PD controllers 14/16 (packaged ICs) then detect that the PSE voltage is above a threshold (e.g., above 37 volts) and issue a high Power-Good (PWRGD) signal at their respective package pins. If the PSE voltage is below the threshold, the PD controllers 14/16 issue a low PWRGD signal, such as a ground voltage. The PWRGD signal issued by the PD controller 14 for the PSE channel 1 is labeled PWRGD1, and the PWRGD signal issued by the PD controller 16 for the PSE channel 2 is labeled PWRGD2.

A high PWRGD1 signal closes a switch 18 (e.g., a MOSFET) internal to the PD controller 14 IC, and a high PWRGD2 signal closes a switch 20 internal to the PD controller 16 IC. If a PWRGD signal is not high, the associated switch 18/20 remains open.

Across the voltage/data wire pair for each channel is connected a capacitor C1 or C2 and a resistor RMPS1 or RMPS2. The resistors are selected to create at least a 10 mA current through the input wires when the associated PWRGD switch 18/20 is closed, even if the channel is not providing power to the PD load 26 during normal operation. This creates the PoE Maintain Power Signature (MPS) current of greater than 10 mA (required by the IEEE standard) that the PSE senses to detect that the PD is still connected to the PSE. The capacitors C1 and C2 smooth switching transients. Accordingly, the RMPS1 and RMPS2 resistors fool the associated PSE that the PD load is drawing power even though that may not be the case. Since both PSEs detect that the MPS requirement is met, both PSEs remain fully operational even though one channel is not supplying current to the PD load 26. This enables hot standby.

Downstream from the resistors is an auxiliary switch 30 (e.g., a MOSFET) for channel 1 and an auxiliary switch 32 for channel 2. The auxiliary switch 32 is closed when the PD controller 16 issues a high PWRGD2 signal. Once the switches 20 and 32 are closed in channel 2, the full PSE voltage of, for example, 44 volts is applied to the diode bridge formed of diodes D1-D4. Diodes D2 and D4 become forward biased and couple the PSE voltage from channel 2 to the input of a conventional power supply 34 for the PD circuit 28. The power supply 34 may be any suitable type for converting the PSE voltage to the regulated voltage (e.g., 5 volts) needed by the PD load 26. In one embodiment, the power supply 34 is a current mode, isolated, flyback-type switching voltage regulator that uses synchronous switching MOSFETs. A transformer is used for isolating the PD load 26 from the PSE, and feedback of the regulator's output signal to its primary side may be via an auxiliary transformer or opto-coupling. The power supply 34 may instead be a current regulator, such as for powering a light emitting diode (LED) load.

A smoothing capacitor C3 may be coupled across the inputs of the power supply 34 for filtering noise.

Since channel 2 is always connected to power the PD load 26 when the PWRGD2 signal is high, channel 2 is the primary channel for supplying power to the PD load 26. As described below, channel 1 is only coupled to supply power to the PD load 26 when channel 2 cannot supply the full PSE voltage and channel 1 can supply the full PSE voltage.

A logic circuit comprising an AND gate 36 and an inverter 38 receive the PWRGD1 and PWRGD2 signals. An inverted PWRG2 is applied to one input of the AND gate 36 and the PWRGD1 signal is applied to the other input of the AND gate 36. Only if the PWRGD2 signal is low (e.g., channel 2 has a PoE fault) and the PWRGD1 signal is high (channel 1 PSE is supplying the full voltage) does the AND gate 36 output go high and close the auxiliary switch 30. Thus, when the channel 2 auxiliary switch 32 is closed, the channel 1 auxiliary switch 30 is open. As a result, the diodes D1 and D3 remain non-conducting, and channel 1 does not draw any current from channel 2. Since the hand-shaking for channel 1 has already been performed, and the PSE for channel 1 still detects the minimum current draw of at least 10 mA, channel 1 is in a hot-standby mode.

If the PSE for channel 2 is removed or there is some fault in channel 2 that caused the PWRGD2 signal to go low, channel 2 is isolated by the opening of switches 20 and 32. Since the PWRGD2 signal is low and the PWRGD1 signal remains high, the AND gate 36 closes the auxiliary switch 30 to immediately couple the full PSE voltage to the input of the power supply 34. Diodes D1 and D3 are fully forward biased, and diodes D2 and D4 are non-conducting.

If, for example, the faulty PSE for channel 2 is replaced, the PD controller 16 performs the hand-shaking and eventually issues a PWRGD2 signal to close switches 20 and 32 and open switch 30. Then, channel 2 supplies current to the PD load 26.

In one embodiment, the PD contains a logic circuit that determines which channel (1 or 2) is the primary channel based on which channel first detects a PSE connected to it. Therefore, the primary channel will first supply current to the load, and the secondary channel will only supply current to the load once the PWRGD signal of the primary channel is not asserted. In this embodiment, the control and switching circuitry associated with each channel may be symmetrical, and the logic circuit generates a signal to enable only one of the channels to close the auxiliary switch 30 or 32. For example, the logic circuit may detect the occurrences of the PWRGD signals from both channels. In one embodiment, upon receiving the first of the PWRGD signals (identifying the primary channel), the logic circuit generates a logical 1 for that channel and a logical 0 for the other channel. An AND gate for each channel may receive the PWRGD signal for that channel and the 1 or 0 logic signal. Therefore, only one of the AND gate outputs can be high. The AND gate output controls the auxiliary switch for that channel. The logic circuit output toggles upon the primary channel de-asserting its PWRGD signal, so that the output of the primary channel AND gate goes low and the output of the secondary channel AND gate goes high, assuming a PWRGD signal is generated by the secondary channel.

Typically, the voltage applied to the input of the power supply 34 is also used to provide power to the components in the power supply 34, such as amplifiers, comparators, etc. A linear regulator may be in the power supply 34 to convert the incoming 44 volts to the low voltages used by the various regulator controller components. Therefore, if neither channel can supply the PoE voltage to the power supply 34, the power supply 34 shuts down. Optionally, the power supply 34 is provided with an enable terminal that is used to properly start up the power supply. When either the PWRGD1 or PWRGD2 signals are high, an OR gate 42 applies a high signal to the enable terminal to cause the power supply 34 to be started up in the optimal way.

Figure 3:
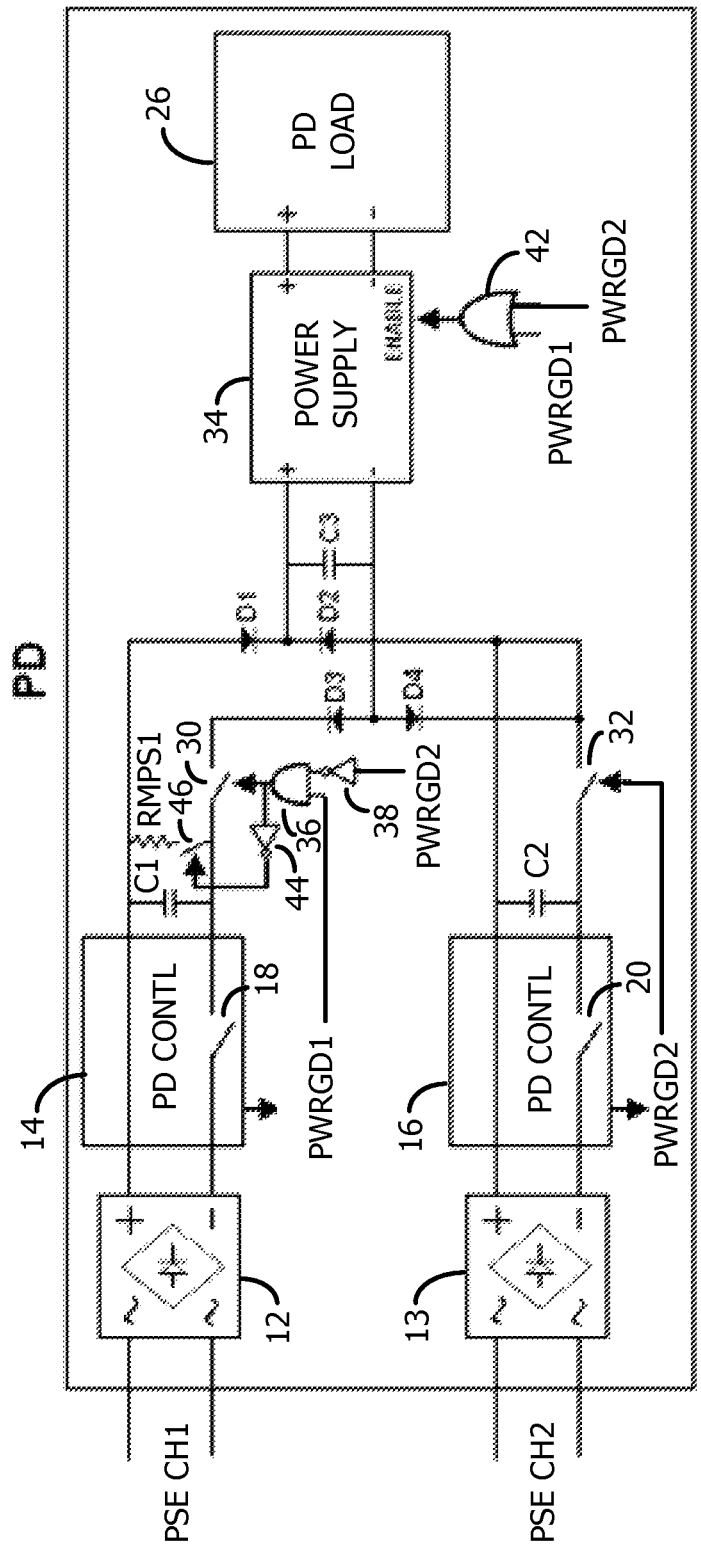
FIG. 3 illustrates a PD coupled to two PSE channels in a PoE system to provide hot-standby, in accordance with another embodiment of the invention.

FIG. 3 illustrates an alternative embodiment that is slightly more power-efficient than the embodiment of FIG. 2. In FIG. 3, there is no RMPS2 resistor because channel 2 is the primary channel and will be drawing at least the MPS current by the PD load 26 during normal operation. Channel 1 still needs the RMPS1 resistor since it will normally be in the hot-standby mode, and its PSE needs to detect a current of at least 10 mA in order to continue supplying the full PoE voltage to channel 1.

Additionally, the RMPS1 resistor is not needed after channel 1 is connected to the power supply 34 and PD load 26, since channel 1 will be drawing more than the 10 mA MPS minimum current. An inverter 44 is coupled to the output of the AND gate 36, and the output of the inverter 44 controls a switch 46 that decouples the RMPS1 resistor from across the wires when the output of the inverter 44 is low. In other words, the switches 46 and 30 will have opposite states. Therefore, when channel 1 is connected to the power supply 34, no current is wasted by the RMPS1 resistor.

In another embodiment, the diodes D1-D4 are replaced with switches (e.g., MOSFETs) that operate as lossless diodes. A comparator for each switch determines the conductivity of each switch. The switches only conduct when the "anode" side is more positive than the "cathode" side. The switches are referred to as lossless diodes rather than pn junction diodes.

Many variations of the disclosed embodiments are possible. The invention allows an idle PD/PSE channel to remain in a hot-standby mode, efficiency is increased over the design of FIG. 1, and the design is smaller and less expensive than the design of FIG. 1, while providing all the same hot-standby benefits. Additional PSE channels may be added.

The invention also applies to any Power Over Data Lines (PoDL) system and not just to PoE.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A Power Over Ethernet (PoE) system, the PoE system being configured to deliver operating power to a load in a Powered Device (PD) via data lines, the PoE system comprising:
   a Powered Device (PD) having a first channel and a second channel, the first channel comprising a first wire pair, the second channel comprising a second wire pair, the PD further comprising:
      a first PD controller having input terminals coupled to the first wire pair, the first PD controller being configured to perform hand-shaking with a first Power Sourcing Equipment (PSE) coupled to the first channel to identify to the first PSE that a first PoE voltage is to be provided on the first channel, the first PD controller having a first Power Good (PWRGD) terminal for issuing a first PWRGD signal upon the first PoE voltage being detected on the first channel;
      a second PD controller having input terminals coupled to the second wire pair, the second PD controller being configured to perform hand-shaking with a second PSE coupled to the second channel to identify to the second PSE that a second PoE voltage is to be provided on the second channel, the second PD controller having a second PWRGD terminal for issuing a second PWRGD signal upon the second PoE voltage being detected on the second channel;
      a first PWRGD switch controlled by the first PD controller, the first PWRGD switch being connected in series with a first wire in the first wire pair, the first PWRGD switch being controlled to be closed upon the first PD controller issuing the first PWRGD signal;
      a second PWRGD switch controlled by the second PD controller, the second PWRGD switch being connected in series with a second wire in the second wire pair, the second PWRGD switch being controlled to be closed upon the second PD controller issuing the second PWRGD signal;
      a rectifying bridge coupled between the first PD controller and a regulating power supply, and coupled between the second PD controller and the regulating power supply;
      a first current load in the first channel drawing at least a minimum current needed to cause the first PSE to continue to supply the first PoE voltage to the first channel when the first PWRGD switch is closed and when the load is not drawing a current from the first channel;
      a first auxiliary switch connected in series with the first PWRGD switch between the first PD controller and the rectifying bridge; and
      a second auxiliary switch connected in series with the second PWRGD switch between the second PD controller and the rectifying bridge,
      the first auxiliary switch and the second auxiliary switch being controlled by the first PWRGD signal and the second PWRGD signal to be in opposite states when one or both of the first PWRGD signal and the second PWRGD signal are issued,
      the first auxiliary switch and the second auxiliary switch being controlled by the first PWRGD signal and the second PWRGD signal to be both open when neither the first PWRGD signal nor the second PWRGD signal is issued,
      wherein only one of the first channel or the second channel is coupled to the rectifying bridge when the first PSE is supplying the first PoE voltage and the second PSE is supplying the second PoE voltage.

2. The system of claim 1 wherein the second PWRGD signal controls the second auxiliary switch, the system further comprising a logic circuit having an output controlling the first auxiliary switch, the first auxiliary switch being closed when the first PWRGD signal is issued and the second PWRGD signal is not issued.

3. The system of claim 2 further comprising a third auxiliary switch selectively coupling the first current load across the first wire pair to draw at least the minimum current, wherein the third auxiliary switch is controlled to be open when the first auxiliary switch is closed, and controlled to be closed when the first auxiliary switch is open.

4. The system of claim 1 further comprising:
   a second current load in the second channel drawing at least a minimum current needed to cause the second PSE to continue to supply the second PoE voltage to the second channel when the second PWRGD switch is closed and when the load is not drawing a current from the second channel.

5. The system of claim 4 wherein the minimum current drawn by the second current load is 10 mA.

6. The system of claim 1 wherein the minimum current drawn by the first current load is 10 mA.

7. The system of claim 1 wherein the regulating power supply is a switching regulator supplying a regulated voltage or current to the load.

8. The system of claim 1 further comprising an OR gate receiving the first PWRGD signal and the second PWRGD signal, an output of the OR gate being coupled to an enable terminal of the power supply.

9. The system of claim 1 wherein the first PD controller is formed as a first integrated circuit, and the second PD controller is formed as a second integrated circuit.

10. The system of claim 1 wherein the hand-shaking comprises a detection and a classification phase.

11. The system of claim 1 wherein the rectifying bridge comprises switches forming lossless diodes.

12. The system of claim 1 wherein the rectifying bridge comprises pn junction diodes.

13. The system of claim 1 further comprising a logic circuit that determines whether the first channel or the second channel has priority in powering the load.

14. The system of claim 13 wherein the logic circuit is configured to grant priority to either the first channel or the second channel depending on which channel first detects a PSE connected to it.

15. The system of claim 13 wherein the logic circuit generates a signal that enables the closing of either the first auxiliary switch or the secondary auxiliary switch depending on which channel first detects a PSE connected to it.

16. A method performed by a Power Over Ethernet (PoE) system, the PoE system being configured to deliver operating power to a load in a Powered Device (PD) via data lines, the PD having a first channel and a second channel, the first channel comprising a first wire pair, the second channel comprising a second wire pair, the method comprising:

performing a first hand-shaking routine by a first PD controller, having input terminals coupled to the first wire pair, between the first PD controller and a first Power Sourcing Equipment (PSE) coupled to the first channel to identify to the first PSE that a first PoE voltage is to be provided on the first channel, the first PD controller having a first Power Good (PWRGD) terminal for issuing a first PWRGD signal upon the first PoE voltage being detected on the first channel;

performing a second hand-shaking routine by a second PD controller, having input terminals coupled to the second wire pair, between the second PD controller and a second PSE coupled to the second channel to identify to the second PSE that a second PoE voltage is to be provided on the second channel, the second PD controller having a second PWRGD terminal for issuing a second PWRGD signal upon the second PoE voltage being detected on the second channel;

controlling a first PWRGD switch by the first PD controller, the first PWRGD switch being connected in series with a first wire in the first wire pair, the first PWRGD switch being controlled to be closed upon the first PD controller issuing the first PWRGD signal;

controlling a second PWRGD switch by the second PD controller, the second PWRGD switch being connected in series with a second wire in the second wire pair, the second PWRGD switch being controlled to be closed upon the second PD controller issuing the second PWRGD signal;

drawing, by a first current load in the first channel, at least a minimum current needed to cause the first PSE to continue to supply the first PoE voltage to the first channel when the first PWRGD switch is closed and when the load is not drawing a current from the first channel;

controlling a first auxiliary switch and a second auxiliary switch by the first PWRGD signal and the second PWRGD signal to be in opposite states when one or both of the first PWRGD signal and the second PWRGD signal are issued, wherein the first auxiliary switch is connected in series with the first PWRGD switch between the first PD controller and a rectifying bridge, and the second auxiliary switch is connected in series with the second PWRGD switch between the second PD controller and the rectifying bridge, wherein the rectifying bridge is coupled between the first PD controller and a regulating power supply, and coupled between the second PD controller and the regulating power supply; and controlling the first auxiliary switch and the second auxiliary switch by the first PWRGD signal and the second PWRGD signal to be both open when neither the first PWRGD signal nor the second PWRGD signal is issued, wherein only one of the first channel or the second channel is coupled to the rectifying bridge when the first PSE is supplying the first PoE voltage and the second PSE is supplying the second PoE voltage.

17. The method of claim 16 wherein the second PWRGD signal controls the second auxiliary switch, the method further comprising controlling the first auxiliary switch, by an output of a logic circuit, the first auxiliary switch being closed when the first PWRGD signal is issued and the second PWRGD signal is not issued.

18. The method of claim 17 further comprising controlling a third auxiliary switch selectively coupling the first current load across the first wire pair to draw at least the minimum current, wherein the third auxiliary switch is controlled to be open when the first auxiliary switch is closed, and controlled to be closed when the first auxiliary switch is open.

19. The method of claim 16 further comprising:
drawing at least a minimum current, through a second current load in the second channel, needed to cause the second PSE to continue to supply the second PoE voltage to the second channel when the second PWRGD switch is closed and when the load is not drawing a current from the second channel.

20. The method of claim 16 further comprising determining whether the first channel or the second channel has priority in powering the load, wherein priority is granted depending on which channel first detects a PSE connected to it.

* * * * *